United States Patent
Park et al.

(10) Patent No.: US 7,518,433 B2
(45) Date of Patent: Apr. 14, 2009

(54) VOLTAGE PUMPING DEVICE

(75) Inventors: Sang Il Park, Icheon-shi (KR); Ja Seung Gou, Goyang-si (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 12/014,832

(22) Filed: Jan. 16, 2008

(65) Prior Publication Data

US 2008/0111613 A1    May 15, 2008

Related U.S. Application Data

(63) Continuation of application No. 11/164,716, filed on Dec. 2, 2005, now Pat. No. 7,345,525.

(30) Foreign Application Priority Data

Apr. 8, 2005    (KR) ............................... 2005-29533

(51) Int. Cl.
*G05F 1/10* (2006.01)
(52) U.S. Cl. .................................. 327/536; 363/60
(58) Field of Classification Search ................. 327/536; 363/59–60
See application file for complete search history.

(56) References Cited

U.S. PATENT DOCUMENTS

| | | | |
|---|---|---|---|
| 4,964,082 A * | 10/1990 | Sato et al. ............... | 365/189.09 |
| 5,157,278 A | 10/1992 | Min et al. | |
| 5,347,172 A | 9/1994 | Cordoba et al. | |
| 5,568,100 A | 10/1996 | Locanthi | |
| 5,642,309 A * | 6/1997 | Kim et al. ............... | 365/185.22 |
| 5,841,725 A | 11/1998 | Kang et al. | |
| 5,877,651 A | 3/1999 | Furutani | |
| 5,883,501 A * | 3/1999 | Arakawa ................... | 323/222 |
| 5,941,990 A * | 8/1999 | Hiiragizawa ................ | 713/310 |

(Continued)

FOREIGN PATENT DOCUMENTS

JP    05-313795    11/1993

(Continued)

OTHER PUBLICATIONS

Yoo, "Dram Design (Book)," Hongreung Science Publishing Company, pp. 216-217, 1996.

*Primary Examiner*—Lincoln Donovan
*Assistant Examiner*—Thomas J Hiltunen
(74) *Attorney, Agent, or Firm*—Marshall, Gerstein & Borun LLP

(57) ABSTRACT

A voltage pumping device is disclosed. The device may include a voltage level detector for detecting a level of a voltage fed back thereto and generating a voltage pumping enable signal according to the detected voltage level, an oscillator for operating in response to the voltage pumping enable signal and generating a desired pulse signal in a normal operation mode, a clock supply controller for receiving an external clock signal, operating in response to the voltage pumping enable signal and outputting the external clock signal in a low-power operation mode, and a voltage pump for performing a voltage pumping operation in response to the pulse signal from the oscillator in the normal operation mode and performing the voltage pumping operation in response to the clock signal from the clock supply controller in the low-power operation mode.

17 Claims, 2 Drawing Sheets

U.S. PATENT DOCUMENTS

| | | | |
|---|---|---|---|
| 5,982,222 A * | 11/1999 | Kyung | 327/536 |
| 5,999,009 A | 12/1999 | Mitsui | |
| 6,052,022 A | 4/2000 | Lee et al. | |
| 6,101,144 A | 8/2000 | Jo | |
| 6,137,343 A | 10/2000 | Matano | |
| 6,262,621 B1 | 7/2001 | Jeon | |
| 6,459,643 B2 | 10/2002 | Kondo et al. | |
| 6,614,699 B2 * | 9/2003 | Tanzawa | 365/189.11 |
| 6,646,494 B2 | 11/2003 | Dohi et al. | |
| 6,667,662 B2 * | 12/2003 | Saito | 331/1 A |
| 6,774,708 B2 | 8/2004 | Matsui | |
| 7,099,223 B2 | 8/2006 | Do | |
| 7,193,427 B2 * | 3/2007 | Persun et al. | 324/765 |
| 7,215,181 B2 * | 5/2007 | Hahn et al. | 327/538 |
| 7,345,525 B2 | 3/2008 | Park et al. | |
| 2002/0000869 A1 * | 1/2002 | Kobayashi et al. | 327/536 |
| 2004/0207458 A1 | 10/2004 | Origasa et al. | |
| 2006/0001478 A1 * | 1/2006 | Do | 327/538 |
| 2006/0061411 A1 * | 3/2006 | Hahn et al. | 327/536 |

FOREIGN PATENT DOCUMENTS

| | | |
|---|---|---|
| JP | 06-028053 | 2/1994 |
| JP | 2001-135450 | 5/2001 |
| JP | 2004-199293 | 7/2004 |
| KP | 10-2006-000867 | 1/2006 |

\* cited by examiner

VOLTAGE PUMPING DEVICE

CROSS-REFERENCE TO RELATED APPLICATIONS

This patent is a continuation of U.S. Ser. No. 11/164,716 filed Dec. 2, 2005, and issued as U.S. Pat. No. 7,345,525 on Mar. 18, 2008, the disclosure of which is hereby expressly incorporated for all purposes.

FIELD OF THE INVENTION

The present invention relates to a voltage pumping device of a semiconductor memory device, and more particularly to a voltage pumping device for controlling voltage pumping power according to whether a semiconductor device is in a normal operation mode or low-power operation mode, so as to reduce current consumption, particularly in the low-power operation mode.

DESCRIPTION OF THE RELATED ART

Generally, a dynamic random access memory (DRAM) includes a plurality of memory cells into/from which data can be written or read and each of which is composed of one transistor and one capacitor. Because an NMOS transistor is employed as the transistor constituting the memory cell of the DRAM and each word line of DRAM is connected to gates of the NMOS transistors, a voltage pumping device for word line driving is provided in the DRAM to generate a potential of external voltage Vdd+threshold voltage Vt+$\Delta$V in consideration of a voltage loss resulting from the threshold voltage Vt of the NMOS transistor.

That is, in order to turn on the NMOS transistor which is mainly used in the DRAM memory cell, a voltage which is higher than the source voltage of the NMOS transistor by the threshold voltage Vt or more must be applied to the gate of the NMOS transistor. Because the maximum voltage applied to the DRAM generally has a Vdd level, it is necessary to apply a boosted voltage of Vdd+Vt or more to the gate of the NMOS transistor in order to read or write a voltage of a complete Vdd level from or into the cell or bit line. Therefore, in order to drive word lines of the DRAM device, there is a need to generate a high enough voltage Vpp, which is the boosted voltage.

It may also be required to generate a voltage Vbb lower than a ground voltage Vss to apply a back bias to a desired portion of a semiconductor device for reduction of leakage current of DRAM cell transistors.

A conventional voltage pumping device has the capability to generate the boosted voltage, Vpp; however, it has the disadvantage of pumping a voltage in such a manner that a semiconductor device has the same current drive capability in a normal operation mode and a low-power operation mode, resulting in unnecessary current consumption. FIG. 1 shows the configuration of such a conventional voltage pumping device. The above problem with the conventional voltage pumping device will hereinafter be described with reference to FIG. 1. Here, the normal operation mode refers to an operation mode where a relatively large amount of power is required, such as an active operation mode of the semiconductor device, and the low-power operation mode refers to an operation mode where a relatively small amount of power is required, such as a standby mode of the semiconductor device.

As shown in FIG. 1, the conventional voltage pumping device comprises a voltage pump 120 for pumping a voltage V_want of a desired level in response to a desired pulse signal osc, a voltage level detector 130 for detecting the level of the voltage V_want fed back from the voltage pump 120 and generating a voltage pumping enable signal ppe according to the detected voltage level, and an oscillator 110 for generating the desired pulse signal osc in response to the voltage pumping enable signal ppe and applying the generated pulse signal osc to the voltage pump 120.

A detailed description will hereinafter be given of the operation of the conventional voltage pumping device with the above-stated configuration.

First, if the voltage level detector 130 detects the level of the voltage V_want fed back from the voltage pump 120 and generates the voltage pumping enable signal ppe according to the detected voltage level, the oscillator 110 generates the desired pulse signal osc in response to the voltage pumping enable signal ppe. At this time, the voltage level detector 130 compares the voltage V_want from the voltage pump 120 with a predetermined voltage to determine whether or not the voltage V_want is higher than the predetermined voltage. If the voltage V_want is lower than the predetermined voltage, the voltage level detector 130 enables the voltage pumping enable signal ppe such that the voltage pump 120 performs a voltage pumping operation. On the contrary, if the voltage V_want is higher than the predetermined voltage, the voltage level detector 130 disables the voltage pumping enable signal ppe such that the voltage pump 120 stops the voltage pumping operation.

Finally, the voltage pump 120 performs the voltage pumping operation in response to the pulse signal osc from the oscillator 110 to pump the voltage V_want of the desired level.

As described above, the conventional voltage pumping device is adapted to pump a voltage with the same driving power irrespective of whether the semiconductor device is in the normal operation mode or low-power operation mode. In other words, in the semiconductor device, current drive capability required in the low-power operation mode is generally much smaller than that required in the normal operation mode. However, in spite of this fact, the conventional voltage pumping device pumps a voltage such that the same currant drive capability is supplied in the low-power operation mode and the normal operation mode. For this reason, the conventional voltage pumping device encounters unnecessary consumption of current, particularly in the low-power operation mode.

SUMMARY OF THE INVENTION

A voltage pumping device of a semiconductor memory device is capable of controlling the amount of a voltage being pumped according to whether the semiconductor device is in a normal operation mode or low-power operation mode, so as to reduce current consumption, particularly in the low-power operation mode.

A voltage pumping device may include a voltage level detector for detecting a level of a voltage fed back thereto and generating a voltage pumping enable signal according to the detected voltage level; an oscillator for operating in response to the voltage pumping enable signal and generating a desired pulse signal in a normal operation mode; a clock supply controller for receiving an external clock signal, operating in response to the voltage pumping enable signal and outputting the external clock signal in a low-power operation mode; and a voltage pump for performing a voltage pumping operation in response to the pulse signal from the oscillator in the normal operation mode and performing the voltage pumping operation in response to the clock signal from the clock supply controller in the low-power operation mode.

The oscillator may operate in response to a desired command signal that makes a level transition depending on whether a semiconductor device is in the normal operation mode or low-power operation mode.

The oscillator may include a first logic unit for performing a logic operation with respect to a buffered signal of the command signal and the voltage pumping enable signal; and an inverter chain operating in response to an output signal from the first logic unit.

The buffered signal may be an inversion-buffered signal of the command signal.

The first logic unit may perform a NOR operation.

The inverter chain may include a second logic unit for receiving the output signal from the first logic unit at one input terminal thereof; and an even number of inverters connected in series between an output terminal of the second logic unit and the other input terminal of the second logic unit.

The second logic unit may perform a NAND operation.

The command signal may be a clock enable signal.

The clock supply controller may operate in response to a desired command signal that makes a level transition depending on whether a semiconductor device is in the normal operation mode or low-power operation mode.

The clock supply controller may include a first logic unit for performing a logic operation with respect to the command signal and the voltage pumping enable signal; and a second logic unit for performing a logic operation with respect to an output signal from the first logic unit and the clock signal.

The first logic unit may perform a NOR operation.

The second logic unit may perform a logical product operation.

The command signal may be a clock enable signal.

Each of the oscillator and clock supply controller may operate in response to a desired command signal which makes a level transition depending on whether a semiconductor device is in the normal operation mode or low-power operation mode.

The voltage pump may provide a voltage resulting from the voltage pumping operation as the voltage fed back to the voltage level detector.

The voltage pumping device may output a high voltage higher than an external voltage of a semiconductor device.

The voltage pumping device may output a back bias voltage lower than a ground voltage of a semiconductor device.

BRIEF DESCRIPTION OF THE DRAWINGS

Various features and advantages of the present invention will be more clearly understood from the following detailed description taken in conjunction with the accompanying drawings, in which.

DETAILED DESCRIPTION

Figure 1:
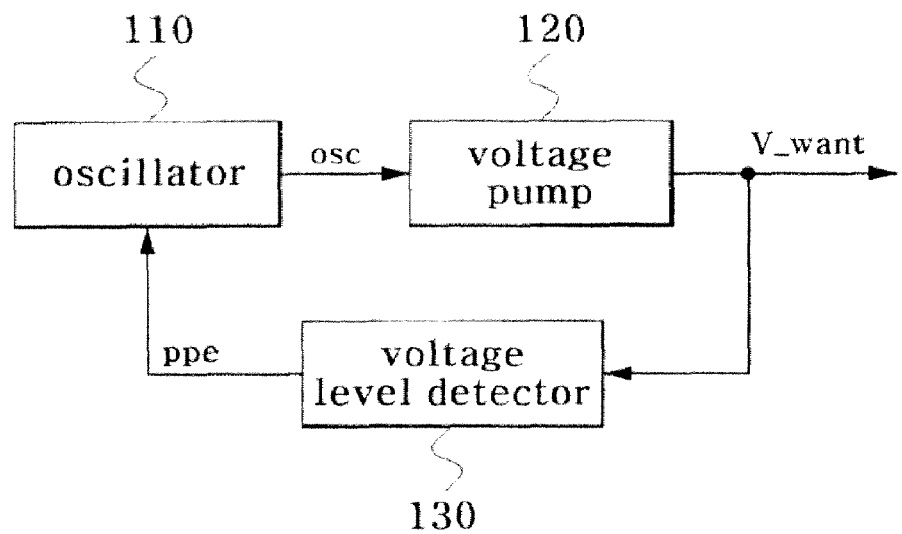
FIG. 1 is a block diagram showing the configuration of a conventional voltage pumping device.
Figure 2:
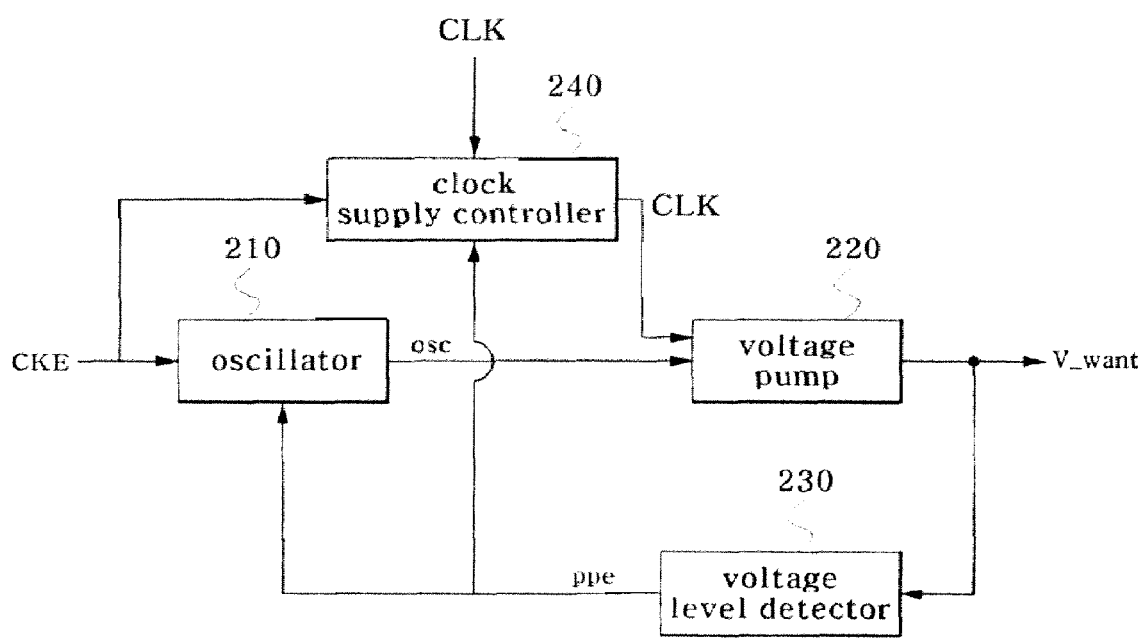
FIG. 2 is a block diagram showing the configuration of a voltage pumping device according to one of the herein described embodiments.

FIG. 2 shows a configuration of a voltage pumping device. As shown in this drawing, the voltage pumping device may include a voltage pump 220, a voltage level detector 230 for detecting the level of a voltage V_want fed back from the voltage pump 220 and generating a voltage pumping enable signal ppe according to the detected voltage level, an oscillator 210 for generating a desired pulse signal osc in response to the voltage pumping enable signal ppe in a normal operation mode, and a clock supply controller 240 for outputting an external clock signal CLK in response to the external clock signal CLK and the voltage pumping enable signal ppe in a low-power operation mode. The voltage pump 220 may be adapted to perform a voltage pumping operation in response to the pulse signal osc from the oscillator 210 in the normal operation mode and perform the voltage pumping operation in response to the clock signal CLK from the clock supply controller 240 in the low-power operation mode.

Each of the oscillator 210 and the clock supply controller 240 may be adapted to operate in response to a clock enable signal CKE, particularly, among desired command signals that make level transitions depending on whether a semiconductor device is in the normal operation mode or low-power operation mode.

Figure 3:
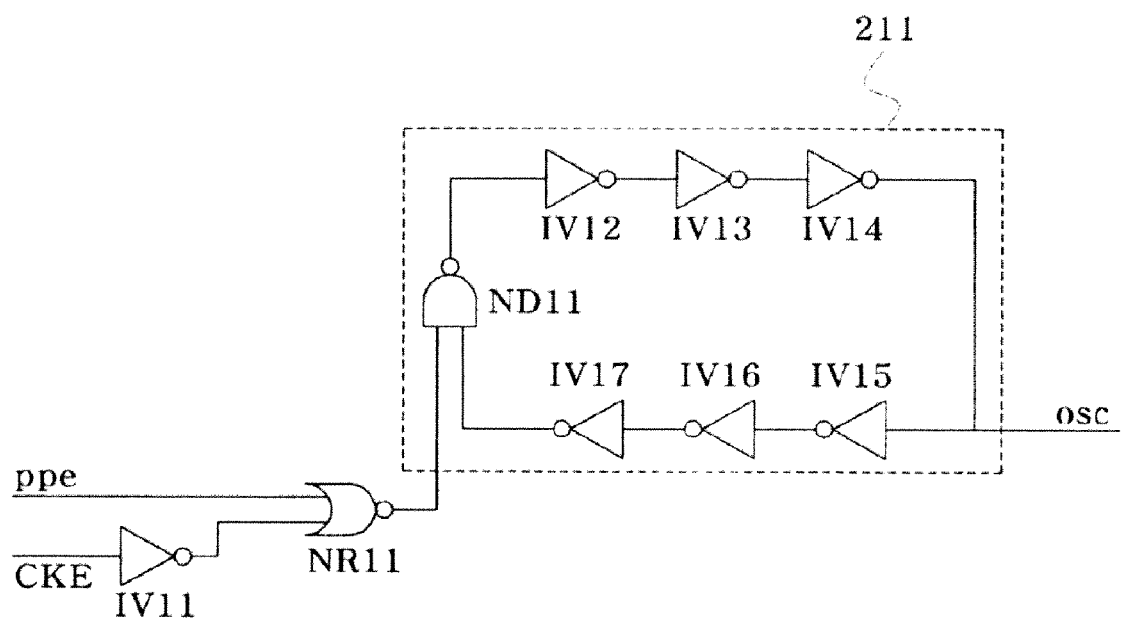
FIG. 3 is a circuit diagram of an oscillator in the voltage pumping device according to one of the herein described embodiments.

FIG. 3 shows a configuration of the oscillator 210. As shown in this drawing, the oscillator 210 may include a NOR gate NR11 for NORing an inversion-buffered signal of the clock enable signal CKE and the voltage pumping enable signal ppe, and an inverter chain 211 operating in response to an output signal from the NOR gate NR11. The inverter chain 211 includes a NAND gate ND11 for receiving the output signal from the NOR gate NR11 at one input terminal thereof, and an even number of inverters IV12 to IV17 connected in series between an output terminal of the NAND gate ND11 and the other input terminal of the NAND gate ND11.

Figure 4:
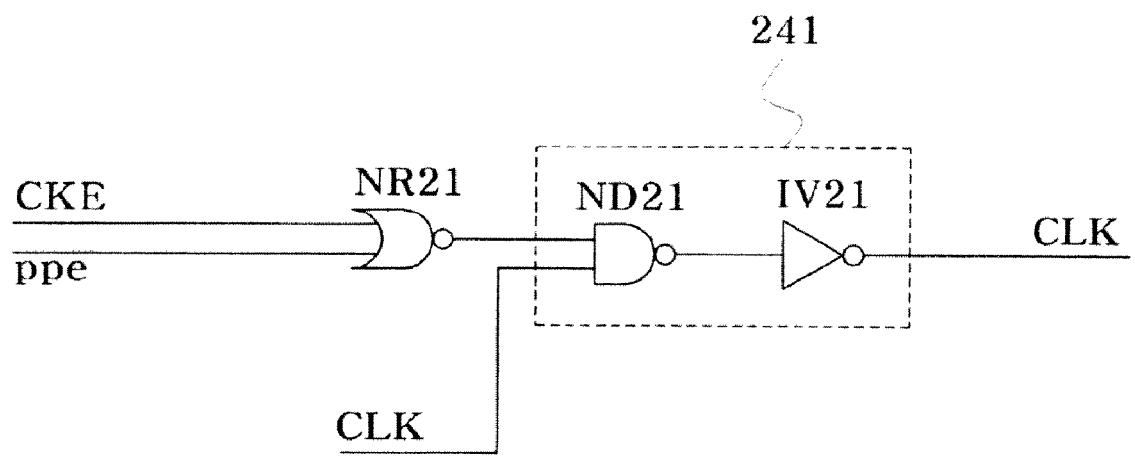
FIG. 4 is a circuit diagram of a clock supply controller in the voltage pumping device according to one of the herein described embodiments.

FIG. 4 shows a configuration of the clock supply controller 240 in the voltage pumping device according to the present embodiment. As shown in this drawing, the clock supply controller 240 may include a NOR gate NR21 for NORing the clock enable signal CKE and the voltage pumping enable signal ppe, and a logic unit 241 for performing a logical product operation with respect to an output signal from the NOR gate NR21 and the clock signal CLK.

The voltage pumping device may be adapted to output a high voltage Vpp which is higher than an external voltage of the semiconductor device, or a back bias voltage Vbb which is lower than a ground voltage.

The operation of a voltage pumping device with the above-stated configuration will hereinafter be described in detail with reference to FIGS. 2 to 4.

The voltage pumping device may have different operation mechanisms depending on whether the semiconductor device is in the normal operation mode or low-power operation mode. In this connection, the operation of the voltage pumping device will be described in conjunction with the respective operation modes. Here, the normal operation mode refers to an operation mode where a relatively large amount of power is required, such as an active operation mode of the semiconductor device in which an input operation, an output operation, etc., is performed, and the low-power operation mode refers to an operation mode where a relatively small amount of power is required, such as a standby mode of the semiconductor device.

First, the voltage level detector 230 detects the level of the voltage V_want fed back from the voltage pump 220 and generates the voltage pumping enable signal ppe according to the detected voltage level. At this time, the voltage level detector 230 compares the voltage V_want from the voltage pump 220 with a predetermined voltage, for example, the high voltage Vpp, to determine whether or not the voltage V_want is higher than the predetermined voltage. If the voltage V_want is lower than the predetermined voltage, the voltage level detector 230 enables the voltage pumping enable signal ppe such that the voltage pump 220 performs the voltage pumping operation. On the contrary, if the voltage V_want is higher than the predetermined voltage, the voltage level detector 230 disables the voltage pumping enable signal ppe such that the voltage pump 220 stops the voltage pumping operation.

Then, each of the oscillator 210 and the clock supply controller 240 receives the voltage pumping enable signal ppe. At this time, each of the oscillator 210 and the clock supply controller 240 receives the clock enable signal CKE in addition to the voltage pumping enable signal ppe.

Here, the clock enable signal CKE makes a level transition depending on whether the semiconductor device is in the normal operation mode or low-power operation mode. More particularly, the clock enable signal CKE assumes a high level when the semiconductor device is in the normal operation mode, and a low level when the semiconductor device is in the low-power operation mode. Although the clock enable signal CKE is used, any other command signals may be used in different embodiments instead of the clock enable signal CKE as long as they make level transitions depending on whether the semiconductor device is in the normal operation mode or low-power operation mode. The clock enable signal CKE may also make a high to low level transition when the semiconductor device is in the normal operation mode, and a low to high level transition when the semiconductor device is in the low-power operation mode.

A description will first be given of the case where the semiconductor device is in the normal operation mode. When the semiconductor device is in the normal operation mode, the clock enable signal CKE makes a low to high level transition. Then, the oscillator 210 is turned on in response to the high-level signal, whereas the clock supply controller 240 is turned off in response to the high-level signal.

That is, in FIG. 3, if the clock enable signal CKE becomes high in level and the voltage pumping enable signal ppe is enabled low in level, the NOR gate NR11 of the oscillator 210 receives the low-level signals at both input terminals thereof and outputs a high-level signal. As a result, because the NAND gate ND11 can operate as a kind of inverter, the inverter chain 211 generates the pulse signal osc for execution of the voltage pumping operation, so that the voltage pump 220 pumps and outputs the voltage V_want of the desired level in response to the pulse signal osc. On the other hand, if the voltage pumping enable signal ppe is disabled high in level, the NOR gate NR11 outputs a low-level signal, so that the inverter chain 211 is disabled to output no pulse signal osc. As a result, the voltage pump 220 performs no voltage pumping operation.

On the other hand, in FIG. 4, because the NOR gate NR21 of the clock supply controller 240 receives the high-level clock enable signal CKE at one input terminal thereof, it outputs a low-level signal irrespective of the level of the voltage pumping enable signal ppe, and the logic unit 241 outputs a low-level signal, too. Namely, in the normal operation mode, the clock supply controller 240 is disabled in response to the clock enable signal CKE of the high level.

In summary, in the normal operation mode, if the voltage level detector 230 detects the level of the voltage V_want fed back from the voltage pump 220 and generates the voltage pumping enable signal ppe according to the detected voltage level, the oscillator 210 generates the desired pulse signal osc in response to the voltage pumping enable signal ppe. Then, the voltage pump 220 performs the voltage pumping operation in response to the pulse signal osc from the oscillator 210 to pump and output the voltage V_want of the desired level. In the normal operation mode, the voltage pumping device may pump and supply a voltage with relatively high drive power using the pulse signal osc from the oscillator 210.

Next, a description will be given of the case where the semiconductor device is in the low-power operation mode. When the semiconductor device is in the low-power operation mode, the clock enable signal CKE makes a high to low level transition. Then, the clock supply controller 240 is turned on in response to the low-level signal, whereas the oscillator 210 is turned off in response to the low-level signal. At this time, the clock supply controller 240 receives the clock signal CLK in addition to the clock enable signal CKE and voltage pumping enable signal ppe. The operation of the clock supply controller 240 will hereinafter be described in detail.

In FIG. 4, if the clock enable signal CKE becomes low in level and the voltage pumping enable signal ppe is also enabled low in level, the NOR gate NR21 of the clock supply controller 240 receives the low-level signals at both input terminals thereof and outputs a high-level signal. The logic unit 241, which is composed of a NAND gate ND21 and an inverter IV21, receives the clock signal CLK and the high-level signal from the NOR gate NR21 and performs a logical product operation with respect to the received signals. At this time, because the output signal from the NOR gate NR21 assumes the high level, the logic unit 241 outputs the same signal as the clock signal CLK. Then, the voltage pump 220 performs the voltage pumping operation in response to the clock signal CLK to pump and output the voltage V_want of the desired level. At this time, the output voltage from the voltage pump 220 results from the pumping operation based on the clock signal CLK and the current drive capability thereof is smaller than that based on the pulse signal osc.

On the other hand, if the voltage pumping enable signal ppe is disabled high in level, the NOR gate NR21 outputs a low-level signal and the logic unit 241 outputs a low-level signal, too, so that the voltage pump 220 performs no voltage pumping operation.

Meanwhile, in FIG. 3, because the NOR gate NR11 of the oscillator 210 receives a high-level signal from an inverter IV11, it outputs a low-level signal regardless of the level of the voltage pumping enable signal ppe. As a result, because the NAND gate ND11 cannot function as an inverter, the oscillator 210 outputs no pulse signal osc for execution of the pumping operation. Consequently, in the low-power operation mode, the oscillator 210 is disabled in response to the clock enable signal CKE of the low level.

In summary, in the low-power operation mode, if the voltage level detector 230 detects the level of the voltage V_want fed back from the voltage pump 220 and generates the voltage pumping enable signal ppe according to the detected voltage level, the clock supply controller 240 outputs the clock signal CLK in response to the voltage pumping enable signal ppe. Then, the voltage pump 220 performs the voltage pumping operation in response to the clock signal CLK from the clock supply controller 240 to pump and output the voltage V_want of the desired level. In the low-power operation mode, the voltage pumping device may pump and supply a voltage with relatively low drive power using the clock signal CLK from the clock supply controller 240.

As described above, a voltage pumping device may pump and supply a voltage with relatively high drive power using the pulse signal osc from the oscillator 210 which is turned on in response to the clock enable signal CKE, in the normal operation mode. It is therefore possible to normally operate the semiconductor device in the normal operation mode. In the low-power operation mode, the voltage pumping device may pump and supply a voltage with relatively low drive power using the clock signal CLK from the clock supply controller 240 which is turned on in response to the clock enable signal CKE. It is therefore possible to prevent unnecessary current consumption.

As apparent from the above description, a voltage pumping device of a semiconductor device may be capable of performing a voltage pumping operation using a pulse signal from an oscillator in a normal operation mode and performing the voltage pumping operation using a clock signal in a low-power operation mode, so as to reduce unnecessary current consumption, particularly in the low-power operation mode, thus improving energy efficiency of the semiconductor device.

Although the various embodiments have been disclosed for illustrative purposes, those skilled in the art will appreciate that various modifications, additions and substitutions are possible, without departing from the scope and spirit of the invention as disclosed in the accompanying claims.

What is claimed is:

1. A voltage pumping device comprising:
   an oscillator for operating in response to a voltage pumping enable signal and a clock enable signal and generating a desired pulse signal in a normal operation mode;
   a clock supply controller for receiving an external clock signal and operating in response to the voltage pumping enable signal and the clock enable signal and outputting a clock signal in a low-power operation mode; and
   a voltage pump for receiving the desired pulse signal from the oscillator and the clock signal from the clock supply controller and performing a voltage pumping operation in response to the desired pulse signal in the normal operation mode and performing the voltage pumping operation in response to the clock signal in the low-power operation mode
   wherein the oscillator includes a first logic unit for performing a logic operation with respect to a buffered signal of the clock enable signal and the voltage pumping enable signal; and an inverter chain operating in response to an output signal from the first logic unit.

2. The voltage pumping device as set forth in claim 1, wherein the voltage pumping device further includes a voltage level detector for detecting a level of a voltage fed back thereto and generating the voltage pumping enable signal according to the detected voltage level.

3. The voltage pumping device as set forth in claim 1, wherein the oscillator is configured to operate in response to the clock enable signal which makes a level transition depending on whether a semiconductor device is in the normal operation mode or low-power operation mode.

4. The voltage pumping device as set forth in claim 1, wherein the first logic unit is adapted to perform a NOR operation.

5. The voltage pumping device as set forth in claim 1, wherein the inverter chain includes:
   a second logic unit for receiving the output signal from the first logic unit at one input terminal thereof; and
   an even number of inverters connected in series between an output terminal of the second logic unit and the other input terminal of the second logic unit.

6. The voltage pumping device as set forth in claim 5, wherein the second logic unit is adapted to perform a NAND operation.

7. The voltage pumping device as set forth in claim 1, wherein the clock supply controller is configured to operate in response to the clock enable signal which makes a level transition depending on whether a semiconductor device is in the normal operation mode or low-power operation mode.

8. The voltage pumping device as set forth in claim 7, wherein the clock supply controller includes:
   a first logic unit for performing a logic operation with respect to the clock enable signal and the voltage pumping enable signal; and
   a second logic unit for performing a logic operation with respect to an output signal from the first logic unit and the clock signal.

9. The voltage pumping device as set forth in claim 8, wherein the first logic unit is adapted to perform a NOR operation.

10. The voltage pumping device as set forth in claim 8, wherein the second logic unit is adapted to perform a logical product operation.

11. The voltage pumping device as set forth in claim 2, wherein each of the oscillator and clock supply controller is configured to operate in response to the clock enable signal which makes a level transition depending on whether a semiconductor device is in the normal operation mode or low-power operation mode.

12. The voltage pumping device as set forth in claim 11, wherein the clock supply controller includes:
    a first logic unit for performing a logic operation with respect to the command signal and the voltage pumping enable signal; and
    a second logic unit for performing a logic operation with respect to an output signal from the first logic unit and the clock signal.

13. The voltage pumping device as set forth in claim 12, wherein the first logic unit is adapted to perform a NOR operation.

14. The voltage pumping device as set forth in claim 12, wherein the second logic unit is adapted to perform a logical product operation.

15. The voltage pumping device as set forth in claim 2, wherein the voltage pump is adapted to provide a voltage resulting from the voltage pumping operation as the voltage fed back to the voltage level detector.

16. The voltage pumping device as set forth in claim 1, wherein the voltage pumping device is adapted to output a high voltage higher than an external voltage of a semiconductor device.

17. The voltage pumping device as set forth in claim 1, wherein the voltage pumping device is adapted to output a back bias voltage lower than a ground voltage of a semiconductor device.

* * * * *